United States Patent Office 2,766,275
Patented Oct. 9, 1956

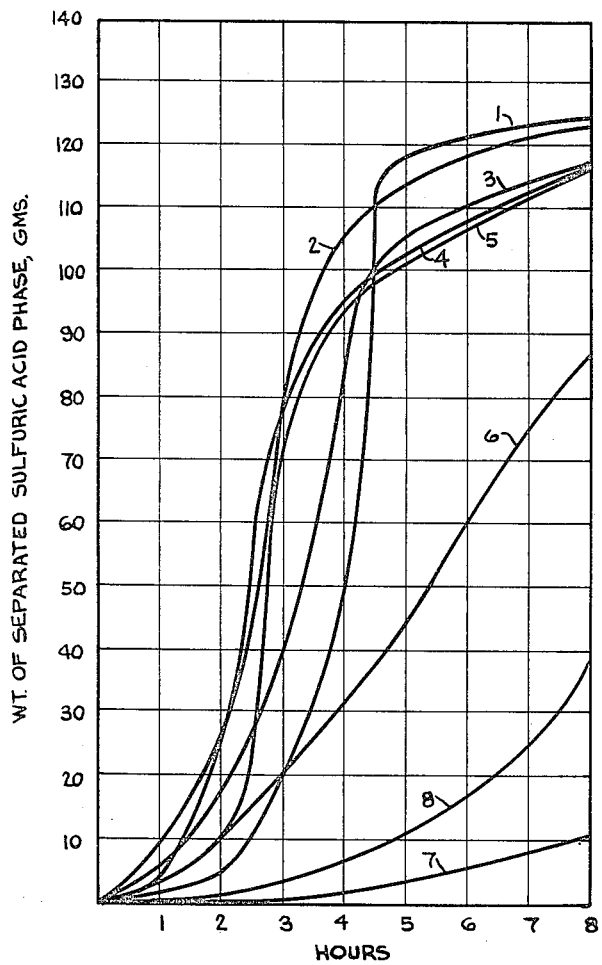
LEGEND:
1. 5% SBAMP, 3% CIPE, 5% DIBE, 17% KE
2. 5% CIPE, 25% KE
3. 3% CIPE, 5% SBAMP, 16% KE
4. 3% CIPE, 5% SBAMP, 22% KE
5. 10% SBAMP, 20% KE
6. 28% KE, 2% TBA
7. 24% KE
8. 30% KE
Inventors: Robert F. Connelly
Robert W. Van Scoy
By James Todorovic
Their Attorney

2,766,275

RECOVERING SULFURIC ACID FROM ACID SLUDGE

Robert F. Connelly, Los Angeles, and Robert W. Van Scoy, Concord, Calif., assignors to Shell Development Company, Emeryville, Calif., a corporation of Delaware Application October 21, 1952, Serial No. 316,032

6 Claims. (Cl. 260—504)

This invention relates to the recovery of sulfuric acid from acid sludges, particularly sulfonation acid sludges. More specifically, it is concerned with the sulfonation of petroleum oils and the recovery of sulfuric acid.

It is well known to treat petroleum oil with strong sulfuric acid to remove undesirable components therefrom and thereby improve certain qualities of the oil. In such a treatment, two layers are generally formed: an oil layer containing oil-soluble petroleum sulfonic acids and a sulfonation acid sludge. This sludge contains in addition to spent sulfuric acid and water, varying amounts of organic impurities, such as water-soluble green sulfonic acids, polycyclic aromatics and resins. The sludge oftentimes is originally highly viscous, and upon aging, becomes a hard mass due to the formation of polymers and tars by the reaction of the spent sulfuric acid and the organic contaminants contained therein. This is particularly true of such sludges as are formed by the treatment of relatively high boiling petroleum distillates, such as lubricating oil distillates, with concentrated or fuming sulfuric acid especially with relatively high dosages of sulfuric acid, as where the primary purpose of the operation is the recovery of the oil-soluble sulfonic acids. The unmanageability of sulfonation acid sludge and the presence of organic impurities therein precludes its use for various purposes, such as the manufacture of ammonium sulfate by reaction of ammonia with the acid content of the sludge. Therefore, sulfonation acid sludge is generally disposed of as waste. Not only is valuable sulfuric acid lost but sludge disposal also presents a major problem. Two disposal methods generally used are burning and dumping at sea.

It is known that a substantial portion of the organic contaminants may be removed from some acid sludges by diluting the same with water and separating the contaminants as a separate phase which may be decanted. However, the phase containing the organic contaminants is highly viscous, particularly in cases where the sludge treated has a relatively high content of resinous and/or polymeric material and/or water-soluble sulfonic acids, and separation thereof from the dilute acid is extremely difficult. The difficulties encountered in the separation and the low yield of acid obtained have made the recovery of sulfuric acid inconvenient and uneconomical. Furthermore, it has heretofore been necessary to employ a large amount of water in the dilution step in order to obtain even low yields of sulfuric acid. The dilute acid obtained not only is extremely corrosive to ordinary processing equipment, but must also be reconcentrated before it can be put to use.

It is, therefore, a principal object of the present invention to provide an improved method for the recovery of sulfuric acid from acid sludge. Another object is to provide a method of recovering sulfuric acid from acid sludge without excessive dilution of the sulfuric acid therein. Still another object is to recover, from sulfonation acid sludge, sulfuric acid which can be used, as in ammonium sulfate production, without reconcentration. Still another object is to provide a method of recovering sulfuric acid from a sulfonation acid sludge obtained in the sulfonation of lubricating oil distillates. Other objects and advantages will be apparent from the following description.

According to the present invention, it has now been found that sulfuric acid can be recovered from an acid sludge by a process which comprises admixing the sludge with a hydrocarbon diluent, an oxygenated organic compound and sufficient water to cause separation of an organic phase containing substantially all of the organic contaminants in the sludge, substantially all of the added hydrocarbon diluent, and substantially all of the added oxygenated organic compound, from an aqueous phase containing aqueous sulfuric acid, specifically aqueous sulfuric acid of about 60% to about 75% effective acidity as $H_2SO_4$. The term "effective acidity" is used to represent the following ratio:

$$\frac{\text{Weight percent } H_2SO_4 \times 100}{\text{Weight percent } H_2SO_4 + \text{weight percent } H_2O}$$

A preferred embodiment of the present invention comprises recovering sulfuric acid from an acid sludge produced in the sulfonation of a relatively high-boiling petroleum oil, such as a lubricating oil distillate, with concentrated sulfuric acid, which term is meant to include fuming acid or oleum, by admixing the separated sludge with a substantial proportion, e. g., not more than about 50% by weight, based on the sludge, of a substantially aromatic liquid hydrocarbon diluent, a minor proportion, e. g., not more than about 10% by weight, based on the sludge, of a liquid, substantially polar, oxygenated organic compound, and sufficient water to cause formation of an organic phase containing substantially all of the organic contaminants of the sludge, substantially all of the added hydrocarbon diluent and substantially all of the added oxygenated organic compound, and an acid phase containing aqueous sulfuric acid having a concentration of about 60% to 75% effective acidity.

Still another embodiment of the present invention contemplates adding a portion or all of the water required to give a resulting sulfuric acid phase of 60–75% effective acidity, to the sulfonated petroleum mixture prior to sludge separation to effect partial separation of the non-settled sludge into an acid layer and a tar layer comprising organic contaminants, stratifying the mixture, separating a sulfonated oil layer from the acid and tar layers, admixing the acid and tar layers with a substantial proportion of a substantially aromatic hydrocarbon diluent, a minor proportion of an oxygenated organic compound, and additional water, if necessary, to cause formation of an organic phase containing substantially all of the organic contaminants of the sludge substantially all of the added hydrocarbon diluent and substantially all of the added oxygenated organic compound, and an acid phase containing aqueous sulfuric acid having a concentration of about 60% to about 75% effective acidity.

The invention is of particular utility for the treatment of viscous acid sludges which are produced in the sulfonation of lubricating oil distillates of substantial aromatic content, as well as extract or raffinate fractions of such distillates. Sludges from the sulfonation of relatively high boiling distillates containing from about 15% to about 50% aromatic-containing hydrocarbons, and which may be either monocyclic, dicyclic or polycyclic ring compounds, or mixtures thereof, and particularly from raffinates obtained from the distillate by selective solvent extraction, are usefully treated by the method of this invention. Particular reference can be made in this connection to lubricating oil distillate selective solvent raffinates from a relatively naphthenic or mixed base stock, which raffinates suitably have viscosity indices of from about 10 to about 75, preferably from about 25 to 60.

The hydrocarbon diluent used in the present invention is preferably a substantially aromatic liquid, relatively fluid and non-viscous hydrocarbon fraction, i. e., a hydrocarbon fraction being predominantly aromatic and having an aromatic content of at least 50%, and preferably at least 60%, although it can be essentially all one or more aromatic hydrocarbons. It is preferred to employ a hydrocarbon or hydrocarbon mixture having an end boiling point below about 650° F. and an initial boiling point of at least about 175° F. preferably at least about 250° F., all at one atmosphere pressure. Suitable diluents include benzene, toluene, xylene, catalytically cracked gas oils, solvent extracts of kerosene distillate, and mixtures of the foregoing, as well as mixtures thereof with non-aromatic hydrocarbons or hydrocarbon fractions of relatively low aromatic content provided that the total aromatic content of the final mixture is at least 50%. It is also possible to employ hydrocarbon mixtures having an aromatic content of less than about 50% as diluents in the process of the present invention; however, at least a portion of these diluents tend to separate as a third phase and, therefore, they are not as desirable as the diluents of higher aromatic content. The amount of hydrocarbon diluent employed should not exceed about 50%, and preferably about 30%, by weight, based on the sludge. At least about 15%, and preferably about 20%, by weight of diluent, based on the sludge is necessary for effective separation.

Any oxygenated organic compound can be used in the practice of the present invention. The oxygenated compound should preferably be relatively stable to the resulting acid phase. The preferred oxygenated compounds are the organic oxy-compounds, including oxa-compounds, and organic oxo-compounds, particularly the aliphatic oxy- and aliphatic oxo-compounds. It is also preferred that the oxygenated compound contain only carbon, hydrogen, and oxygen atoms. The term "oxy-compounds" includes ethers and alcohols, i. e., compounds having the structure R—O—R and R—OH, respectively, wherein the R's represent various organic radicals, preferably hydrocarbon radicals. The term "oxo-compounds" includes aldehydes and ketones, i. e., compounds having the formula

and

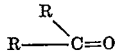

respectively, wherein the R's represent various organic radicals, preferably hydrocarbon radicals. Organic carboxylic acids and esters thereof can also be employed. Particularly suitable oxygenated compounds include the aliphatic alcohols, such as the methyl, ethyl, propyl, butyl, amyl, hexyl, heptyl and octyl alcohols, and the glycols, such as ethylene glycol, propylene glycol, and their homologs, as well as the polymers thereof; aromatic hydroxy compounds such as benzyl alcohol, phenols, cresols and xylenols; naphthenic alcohols and ketones such as cyclohexanol and cyclohexanone; ketones such as acetone, methyl ethyl ketone, methyl isobutyl ketone, diisobutyl ketone, octyl ketones, acetophenone; ethers, such as ethyl ether, the propyl ethers, the butyl ethers, and diphenyl ethers; aldehydes, such as propionaldehyde, butyraldehyde and benzaldehyde; carboxylic acids and esters, such as isobutyric acid and the esters thereof, acetic acid esters, propionic acid esters, and benzoic acid esters; and heterocyclic oxygen compounds such as dioxane; as well as mixtures of the foregoing. Ethers, alcohols and ketones, being relatively non-reactive are preferred for the present invention. Oxygenated organic compounds containing not more than about 30 carbon atoms per molecule are preferred. By-products from certain refining operations, which by-products contain oxygenated organic compounds, have been found to be very effective in the sulfuric acid recovery process. Examples of these by-products are: "secondary butyl alcohol mixed polymer" which is obtained in the refining of crude secondary butyl alcohol and which contains di-secondary butyl ether, octyl alcohols, octylenes and certain polyolefinic materials which boil above 100° C.; "methyl isobutyl carbinol bottoms" which is obtained in the refining of crude methyl isobutyl carbinol and crude methyl isobutyl ketone and which contains diisobutyl carbinol, diisobutyl ketone, small amounts of $C_{12}$ and $C_{15}$ alcohols and ketones, $C_9$ olefins and $C_{12}$ olefins; and "crude isopropyl ether" which is obtained in the refining of crude isopropyl alcohol and which contains at least 80% diisopropyl ether, the remainder being hexylenes, $C_9$ olefins and small amounts of acetone and isopropyyl alcohol. It has also been found that the combination of minor amounts of cresylic acids with a different oxygenated organic compound are unusually effective in promoting the separation of organic contaminants from dilute sulfuric acid.

Since oxygenated organic compounds, particularly those of relatively low molecular weight, are soluble, to some extent, in sulfuric acid, it is best to avoid using excessive amounts thereof in order to prevent contamination, as well as dilution, of the recovered sulfuric acid. The use of excessive amounts of oxygenated compounds also results in higher residual acidity in the resulting hydrocarbon phase containing organic contaminants. In general, amounts of from about 1% to about 10%, preferably from about 3% to about 8%, will be found to be effective. The amount of oxygenated compound employed depends, to some extent, upon the aromatic content of the hydrocarbon diluent. Thus, when using a hydrocarbon diluent of relatively low aromatic content, relatively higher amounts of a given oxygenated compound should be used. Since the oxygenated compounds are available only in limited quantities and are somewhat more expensive than aromatic hydrocarbon materials, it is preferred to use a hydrocarbon diluent of relatively high aromatic content (at least about 65%) so that a relatively minor amount of the oxygenated compound can be used. The amount of combined hydrocarbon diluent and oxygenated organic compound used in the present process should be at least about 20%, and preferably from about 25% to about 35%, by weight, based on the sludge. It is preferred that the oxygenated organic compound employed be preferentially oil-soluble and substantially miscible with the hydrocarbon diluent so that substantially all of the oxygenated compound will separate in the resulting hydrocarbon phase.

The amount of water necessary to give effective separation of organic contaminants from usable sulfuric acid varies with the type of sludge treated. In general, most effective separation, with least dilution, is obtained at a sulfuric acid concentration of about 60–75% effective acidity. Generally, with a sulfonation acid sludge produced in the sulfonation of lubricating oil distillates, about 10% to about 25% by weight of water, based on the sludge, will be required to obtain an effective acidity of about 60–75%.

In order that the invention will be better understood, a preferred embodiment thereof will be described in detail with particular reference to the recovery of sulfuric acid from an acid sludge produced in the sulfonation of a 30 V. I. furfural-raffinate of a bulk distillate having a viscosity of 60 SUS at 210° F. and obtained from a mixture of naphthenic California crudes. The oil raffinate contained about 65% paraffins and naphthenes, about 20% monocyclic aromatics, about 13% dicyclic aromatics, and about 2% of resins and polycyclic aromatics. The raffinate was pretreated with from about 5 to about 10% by weight of 98% sulfuric acid to remove a portion of the more reactive and undesirable highly aromatic materials. The mixture was permitted to settle and an oil layer was separated from a pretreat acid sludge layer. The pretreated oil was then contacted with about 30% by weight, based on the feed oil, of fuming sulfuric acid (105% $H_2SO_4$) under sulfonating conditions. About 2 volumes of a light, substantially non-aromatic hydrocarbon diluent was added to the non-settled reaction mixture in order to effect the separation of unreacted oil and oil-soluble petroleum sulfonic acids from spent sulfuric acid water-soluble green sulfonic acids and other organic contaminants, such as polycyclic aromatics and resins. The diluted mixture was allowed to settle to obtain an upper layer of substantially non-aromatic hydrocarbon diluent containing unreacted oil and oil-soluble petroleum sulfonic acids, and a lower layer of sulfonation acid sludge containing spent sulfuric acid, water-soluble green sulfonic acids and other organic contaminants, such as polycyclic aromatics and resins. The resulting layers were then separated. Some reaction of the substantially non-aromatic diluent with sulfuric acid occurred, resulting in the loss, by solution and reaction of about 1–2% of the diluent to the acid sludge phase.

The total sludge obtained was from about 50 to about 60% by weight, based on the oil feed. The pretreat sludge made up from about 15% to about 30% by weight of the total sludge.

The pretreat acid sludge and the sulfonation acid sludge can be treated separately according to the present invention, or they can be admixed and treated together. It is preferred to mix the sludges together and then treat the mixed sludge since the viscosity of the tarry phase resulting from the sludge treating process is lower and the stratification of the resulting phases is more rapid when treating the mixed sludge than when treating the sulfonation sludge alone.

The pretreat acid sludge was mixed with the sulfonation acid sludge, and the resulting mixed sludge was treated with about 20% to about 25% by weight, based on the mixture, of a substantially aromatic hydrocarbon diluent, such as an $SO_2$-extract of a kerosene distillate having a boiling point range of from about 400° F. to about 550° F. and containing about 75% aromatics, from about 3% to about 8% by weight, based on the sludge mixture, of an oxygenated organic compound, such as a mixture of "secondary butyl alcohol mixed polymer" and "methyl isobutyl carbinol bottoms," and from about 15% to about 20%, by weight of water. The mixture was permitted to settle, and an organic phase containing substantially all of the organic contaminants of the sludge, i. e., green sulfonic acids, polycyclic aromatics and resins, substantially all of the added hydrocarbon diluent and substantially all of the added oxygenated compound, separated from an aqueous sulfuric acid phase of about 60–75% effective acidity, as $H_2SO_4$. All of the substantially aromatic hydrocarbon diluent and substantially all of the added oxygenated organic compound separated in the upper phase with the organic contaminants. The resulting phases were separated, e. g., by decantation.

The treatment of the acid sludge was preferably carried out in a completely closed system in order substantially to exclude oxygen therefrom. It was particularly desirable to minimize contact of the resulting hydrocarbon phase with oxygen.

In view of the high heat of dilution of concentrated sulfuric acid, it may be desirable to provide means for dissipating the heat generated in the dilution step in order to prevent the formation of solid coke-like material. The temperature at which the diluted mixture is maintained varies with the type of sludge treated. In the foregoing illustration the diluted mixture was preferably maintained at a temperature of about 150° F.

By the above-described procedure, from about 85% to about 90% of the sulfuric acid content of the sludge can be recovered as usable sulfuric acid, and at least about 90% of the total amount of organic contaminants is concentrated in the upper, organic phase. The recovered sulfuric acid can be used, without reconcentration, in the production of ammonium sulfate. If desired, the recovered sulfuric acid can be reconcentrated and reused in the sulfonation reaction.

According to another embodiment of the present invention, a petroleum oil was sulfonated according to the procedure described above. The resulting non-settled reaction mixture was combined with about 2 volumes of a light, substantially non-aromatic hydrocarbon diluent to effect the separation of unreacted oil and oil-soluble petroleum sulfonic acids from sulfonation acid sludge containing spent sulfuric acid, water-soluble green sulfonic acids and other organic contaminants, and with sufficient water to effect partial separation of the non-settled acid sludge into a tar layer containing organic contaminants and an acid layer containing sulfuric acid of about 65% effective acidity. The diluted mixture was allowed to settle to obtain a layer of hydrocarbon diluent containing unreacted oil and oil-soluble petroleum sulfonic acids, a tar layer and an acid layer. The hydrocarbon layer was separated from the tar and acid layers. The combined tar and acid layers were then mixed with the pretreat acid sludge whereby the effective acidity of the acid layer was increased to about 70%. The resulting mixture was then combined with about 20% to 25% by weight, based on the mixture, of a substantially aromatic hydrocarbon diluent, such as the above-described $SO_2$-extract of a kerosene distillate, and about 3% to about 8% by weight, based on the sludge mixture, of an oxygenated organic compound, such as a mixture of "secondary butyl alcohol mixed polymer" and "methyl isobutyl carbinol bottoms." The mixture was permitted to settle, and an organic phase containing substantially all of the organic contaminants of the sludge, substantially all of the added hydrocarbon diluent, and substantially all of the added oxygenated organic compound, and an aqueous sulfuric acid phase of about 70% effective acidity were readily obtained. The resulting phases were then separated.

In order to illustrate the advantages of the present invention, 200 gram samples of a sulfonation sludge, produced in the above-described sulfonation process, were admixed with sufficient water to obtain sulfuric acid of about 65% effective acidity, and with various hydrocarbon diluents both with and without an oxygenated organic compound, as shown on the accompanying graph. Referring to the graph KE is kerosene extract, i. e., an $SO_2$ extract of a kerosene distillate; DIBE is diisobutylene heavy ends, a hydrocarbon material obtained in the production and refining of diisobutylene, CIPE is "crude isopropyl ether"; TBA is tertiary butyl alcohol; and SBAMP is "secondary butyl alcohol mixed polymer." The diluted sludge contained about 130 grams of dilute sulfuric acid. The various samples were permitted to settle at 140° F., and the amount of separated sulfuric acid phase, in grams, was plotted against settling time, in hours. For a commercially feasible sludge-splitting process, substantial separation of the sulfuric acid phase from the hydrocarbon phase should be obtained within, at most, 8 hours, and preferably within 6 hours. It can be seen from the graph that substantially all of the sulfuric acid of the sludge was recovered within 8 hours where both a hydrocarbon diluent and an oxygenated organic compound were added. With a hydrocarbon diluent alone, satisfactory separation was not effected within 8 hours.

The various samples were permitted to settle for 25 hours. The viscosity of the hydrocarbon phase containing organic contaminants was then measured. The results are set forth in the table.

Table

| Additives | Viscosity, SSF at 140° F. |
|---|---|
| 1. 5% SBAMP, 3% CIPE, 5% DIBE, 17% KE | 118.4 |
| 2. 5% CIPE, 25% KE | 341 |
| 3. 3% CIPE, 5% SBAMP, 16% KE | 750 |
| 4. 3% CIPE, 5% SBAMP, 22% KE | 368 |
| 5. 10% SBAMP, 20% KE | 499 |
| 6. 2% TBA, 28% KE | 1,058 |
| 7. 24% KE | 1,710 |
| 8. 30% KE | 1,617 |

The viscosity of the upper, tarry phase containing organic contaminants is substantially lower where both a hydrocarbon diluent and an oxygenated organic compound is added than where only a hydrocarbon diluent is added. This upper phase is suitable for use as a fuel.

It has further been found that the treatment of sulfonation acid sludges according to the practice of the present invention permits the use of higher dosages of sulfuric acid in the sulfonation reaction than heretofore feasible. Previously, the amount of concentrated sulfuric acid used in the sulfonation reaction was limited to not more than about 30% by weight of the oil charge, since with higher dosages, the sludge obtained was so viscous that conventional sludge treating processes were of little use. With the sludge treating process of the present invention, the sulfuric acid dosage in the sulfonation step can be increased to about 35% without encountering any difficulties in the sludge treatment step.

Although the invention has been described in detail with reference to sulfonation acid sludges, it is likewise applicable to other acid sludges high in sulfonic acid content and to spent alkylation acid.

We claim as our invention:

1. A method of sulfonating petroleum oils which comprises contacting a mineral lubricating oil fraction containing from about 15% to about 50% by weight of aromatic-containing compounds with concentrated sulfuric acid under sulfonating conditions, admixing the reaction mixture with a substantially non-aromatic hydrocarbon diluent, stratifying the resulting mixture to obtain a separate layer of hydrocarbon containing oil and oil-soluble petroleum sulfonic acids and a layer of sulfuric acid sludge, separately recovering the resulting layers, admixing the recovered sulfuric acid sludge with (a) from about 15% to about 50% by weight, based on the sludge, of a liquid hydrocarbon material having an aromatic content of at least about 50% by weight, (b) from about 1% to about 10% by weight, based on the sludge of an aliphatic oxygenated compound, and (c) an amount of water sufficient to reduce the concentration of the sulfuric acid in the sludge to a concentration of from about 60% to about 75% effective acidity, forming a two phase system consisting of an organic phase containing substantially all of the organic contaminants of the sludge, substantially all of said aromatic hydrocarbon and substantially all of said aliphatic oxygenated organic compound, and an aqueous sulfuric acid phase and thereafter separating said organic phase from said aqueous phase.

2. A method for recovering sulfuric acid from a sulfuric acid sludge produced in the preparation of petroleum mahogany sulfonates wherein a lubricating oil fraction containing from about 15% to about 50% by weight of aromatic-containing compounds is contacted with concentrated sulfuric acid under sulfonating conditions, the reaction mixture is contacted with a substantially non-aromatic hydrocarbon diluent, the resulting mixture is stratified to obtain a separate layer of hydrocarbon diluent containing oil and oil-soluble petroleum sulfonic acids and a layer of sulfuric acid sludge, and the resulting layers are separated, which method comprises admixing said sulfuric acid sludge with (a) from about 20% to about 30% by weight, based on the sludge, of a liquid hydrocarbon material boiling in the range of from about 175° F. to about 650° F. at one atmosphere pressure and having an aromatic content of at least about 60%, (b) from about 1% to about 10% by weight, based on the sludge, of an aliphatic oxygenated organic compound selected from the group consisting of aliphatic oxy-compounds and aliphatic oxo-compounds, and (c) an amount of water sufficient to reduce the concentration of the sulfuric acid in the sludge to a concentration of from about 60% to about 75% effective acidity, forming a two phase system consisting of an organic phase containing substantially all of the organic contaminants of the sludge, substantially all of said aromatic hydrocarbon and substantially all of said aliphatic oxygenated organic compound, and an aqueous sulfuric acid phase and thereafter separating said organic phase from said aqueous phase.

3. A method for recovering sulfuric acid from a sulfuric acid sludge produced in the preparation of petroleum mahogany sulfonates wherein a lubricating oil fraction containing from about 15% to about 50% by weight of aromatic-containing compounds is contacted with concentrated sulfuric acid under sulfonating conditions, the reaction mixture is stratified to obtain a separate layer of oil and oil-soluble petroleum sulfonic acids and a layer of sulfuric acid sludge, and the resulting layers are separated, which method comprises admixing said sulfuric acid sludge with (a) from about 20% to about 30% by weight, based on the sludge, of a liquid hydrocarbon material having an aromatic content of at least about 60% by weight and boiling within the range of from about 250° F. to about 650° F., (b) from about 3% to about 8% by weight, based on the sludge, of an aliphatic oxygenated organic compound selected from the group consisting of aliphatic oxy-compounds and aliphatic oxo-compounds, and (c) an amount of water sufficient to reduce the concentration of the sulfuric acid in the sludge to a concentration of from about 60% to about 75% effective acidity, forming a two phase system consisting of an organic phase containing substantially all of the organic contaminants of the sludge, substantially of of said aromatic hydrocarbon and substantially all of said aliphatic oxygenated organic compound, and an aqueous sulfuric acid phase and thereafter separating said organic phase from said aqueous phase.

4. The method according to claim 3, wherein the aliphatic oxygenated organic compound is diisopropyl ether.

5. The method according to claim 3, wherein the aliphatic oxygenated organic compound is a mixture of diisobutyl carbinol and diisobutyl ketone.

6. The method according to claim 3, wherein the aliphatic oxygenated organic compound is a mixture of di-secondary-butyl ether and an octyl alcohol.

References Cited in the file of this patent

UNITED STATES PATENTS

| | | |
|---|---|---|
| 1,087,888 | Petroff | Feb. 17, 1914 |
| 1,868,596 | Eichwald | July 26, 1932 |
| 2,036,299 | Robinson | Apr. 7, 1936 |
| 2,223,194 | Thompson | Nov. 26, 1940 |
| 2,304,280 | Read | Dec. 8, 1942 |
| 2,479,202 | Bransky | Aug. 16, 1949 |
| 2,654,777 | Lemmon et al. | Oct. 6, 1953 |